United States Patent
LoGiudice

(10) Patent No.: US 10,309,562 B2
(45) Date of Patent: Jun. 4, 2019

(54) METAL TO METAL WEDGE RING SEAL

(71) Applicant: Freudenberg Oil & Gas, LLC, Houston, TX (US)

(72) Inventor: Michael LoGiudice, Cypress, TX (US)

(73) Assignee: Freudenberg Oil & Gas, LLC, Houston, TX (US)

( * ) Notice: Subject to any disclaimer, the term of this patent is extended or adjusted under 35 U.S.C. 154(b) by 0 days.

(21) Appl. No.: 15/653,075

(22) Filed: Jul. 18, 2017

(65) Prior Publication Data

US 2019/0024828 A1    Jan. 24, 2019

(51) Int. Cl.

| F16J 15/10 | (2006.01) |
|---|---|
| F16L 17/02 | (2006.01) |
| F16J 15/08 | (2006.01) |
| E21B 33/12 | (2006.01) |
| F16J 15/16 | (2006.01) |
| F16J 15/28 | (2006.01) |

(52) U.S. Cl.
CPC .......... *F16L 17/02* (2013.01); *E21B 33/1212* (2013.01); *F16J 15/0887* (2013.01); *F16J 15/10* (2013.01); *F16J 15/164* (2013.01); *F16J 15/28* (2013.01)

(58) Field of Classification Search
CPC .......... F16J 15/0887; F16J 15/10; F16L 17/02
See application file for complete search history.

(56) References Cited

U.S. PATENT DOCUMENTS

| 727,839 A | 5/1903 | Raymond |
| 2,791,194 A | 5/1957 | Janise |
| 2,837,360 A | 6/1958 | Ladd |
| 4,457,523 A | 7/1984 | Hailing et al. |
| 4,462,568 A | 7/1984 | Taylor et al. |
| 4,477,057 A | 10/1984 | Friess |
| 4,556,224 A | 12/1985 | Le |
| 5,092,609 A * | 3/1992 | Balzano ............... F04B 53/164 277/589 |
| 5,333,692 A | 8/1994 | Baugh et al. |

(Continued)

FOREIGN PATENT DOCUMENTS

| CN | 205331640 U | 6/2016 |
| EP | 0418056 A1 | 3/1991 |

(Continued)

*Primary Examiner* — Gilbert Y Lee
(74) *Attorney, Agent, or Firm* — Daniel J. Sepanik, Esq.; Harness, Dickey & Pierce, P.L.C.

(57) ABSTRACT

A seal assembly includes an outer member defining a bore and an inner member received in the bore of the outer member and one of the outer member and the inner member defining a shoulder portion. An inner circular cross-section metallic ring member and an outer circular cross-section metallic ring member are disposed between the outer member and inner member and against the shoulder portion. A wedge member engages the inner circular cross-section metallic ring member and the outer circular cross-section metallic ring member for applying an axial force against each of the inner and outer circular cross-section metallic ring members in a direction toward the shoulder portion and for applying a radially outer force against the outer circular cross-section metallic ring member and for applying a radially inner force against the inner circular cross-section metallic ring member.

19 Claims, 2 Drawing Sheets

(56) References Cited

U.S. PATENT DOCUMENTS

| | | | |
|---|---|---|---|
| 5,685,369 | A | 11/1997 | Ellis et al. |
| 6,705,615 | B2 | 3/2004 | Milberger et al. |
| 6,983,940 | B2 | 1/2006 | Halling |
| 7,234,533 | B2 | 6/2007 | Gambier |
| 8,104,769 | B2 | 1/2012 | Hailing |
| 8,997,882 | B2 | 4/2015 | Turley et al. |
| 2011/0057395 | A1 | 3/2011 | Mercer et al. |
| 2014/0130329 | A1 | 5/2014 | Changsrivong et al. |

FOREIGN PATENT DOCUMENTS

| | | |
|---|---|---|
| FR | 2708967 A1 | 2/1995 |
| GB | 830062 A | 3/1960 |

\* cited by examiner

METAL TO METAL WEDGE RING SEAL

FIELD

The present disclosure relates to a metal to metal wedge ring seal.

BACKGROUND

This section provides background information related to the present disclosure which is not necessarily prior art.

When connecting adjacent sections of fluid flow conduits or vessels, seal rings are typically interposed at the interface of adjacent connecting conduits or vessel portions which are then bolted or clamped together. Most known seal rings and joints work, to a greater or lesser extent, when the pressure within the conduit, pressure vessel or the like is considerably greater than the ambient pressure outside of the conduit, pressure vessel or the like so that the seal or joint is pressure energized.

SUMMARY

This section provides a general summary of the disclosure, and is not a comprehensive disclosure of its full scope or all of its features.

A seal assembly according to the present disclosure includes an outer member defining a bore and an inner member received in the bore of the outer member and one of the outer member and the inner member defining a shoulder portion. An inner circular cross-section metallic ring member and an outer circular cross-section metallic ring member are disposed between the outer member and inner member and against the shoulder portion. A wedge member engages the inner circular cross-section metallic ring member and the outer circular cross-section metallic ring member for applying an axial force against each of the inner and outer circular cross-section metallic ring members in a direction toward the shoulder portion and for applying a radially outer force against the outer circular cross-section metallic ring member and for applying a radially inner force against the inner circular cross-section metallic ring member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
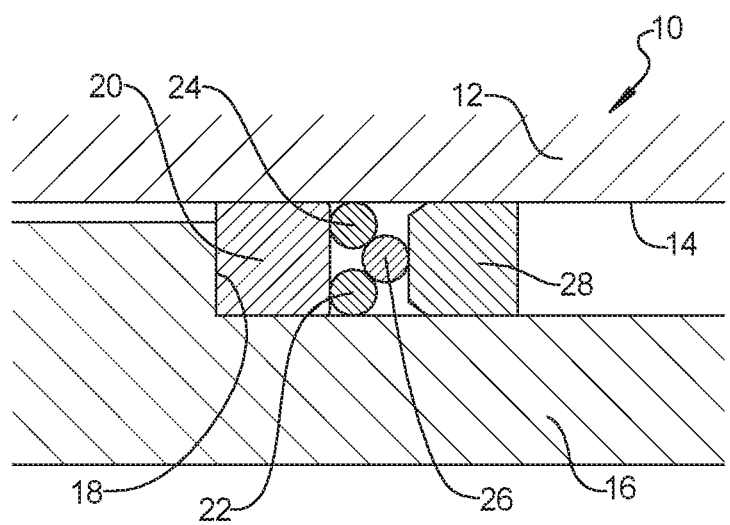
FIG. 1 is a partial cross-sectional view of a metal to metal wedge ring seal according to a first embodiment.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a seal assembly 10 is shown including an outer member 12 defining a bore 14. An inner member 16 is received within the bore 14 and includes an annular shoulder 18 that extends radially outward. The outer and inner members 12, 16 can be parts of a downhole well tool, wellhead, pipe flange connections and other applications. An annular backing member 20 can optionally be disposed against the annular shoulder 18 radially between the outer member 12 and the inner member 16. An inner ring member 22 is disposed directly radially outward and adjacent to the inner member 16 and axially adjacent to the annular backing member 20. An outer ring member 24 is disposed directly radially inward and adjacent to the outer member 12 and axially adjacent to the annular backing member 20 at a location directly radially outward of the inner ring member 22. A wedge member 26 is disposed radially at a proximate midpoint between the inner ring member 22 and outer ring member 24 and in direct contact therewith. An annular pressing member 28 is disposed against the wedge member 26 for providing an axial force against the wedge member 26.

In the embodiment shown in FIG. 1, the inner ring member 22, the outer ring member 24 and the wedge member 26 can all have a circular, partial circular, partial curved or elliptical cross-section or other shape that creates a wedging effect and can be made of a metallic material such as stainless steel, carbon steel alloy, or nickel alloy. Alternatively, the inner ring member 22, the outer ring member 24 and the wedge member 26 can be made of materials such as a thermoplastic, composite or elastomer. The inner ring member 22, the outer ring member 24 and the wedge member 26 can be coated with a second material such as silver, thermoplastic or other materials which are softer than the sealing surface of the inner member 16 or outer member 12 to allow greater sealing performance on rough surface finishes.

Figure 2:
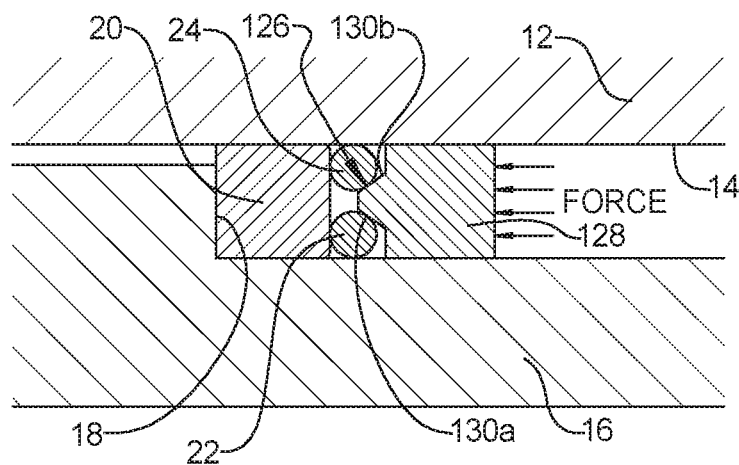
FIG. 2 is a partial cross-sectional view of a metal to metal wedge ring seal according to a second embodiment.
Figure 4:
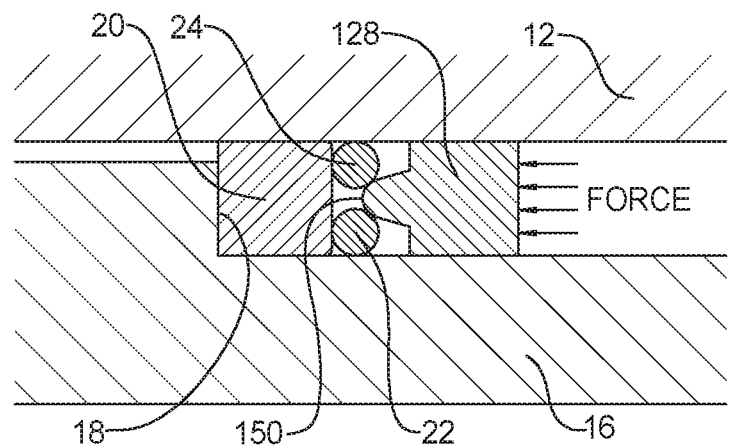
FIG. 4 is a partial cross-sectional view of a metal to metal wedge ring seal according to a fourth embodiment.

As an alternative, as shown in FIG. 2, the wedge member 126 can be modified to be formed integral with the annular pressing member 128. In particular, the wedge member 126 can include a pair of linearly sloped driving surfaces 130a, 130b that engage the inner ring member 22 and outer ring member 24, respectively. Although the sloped driving surfaces 130a, 130b have been shown as linear surfaces, it should be understood that the driving surface 150 can be curved, as shown in the embodiment of FIG. 4.

Figure 3:
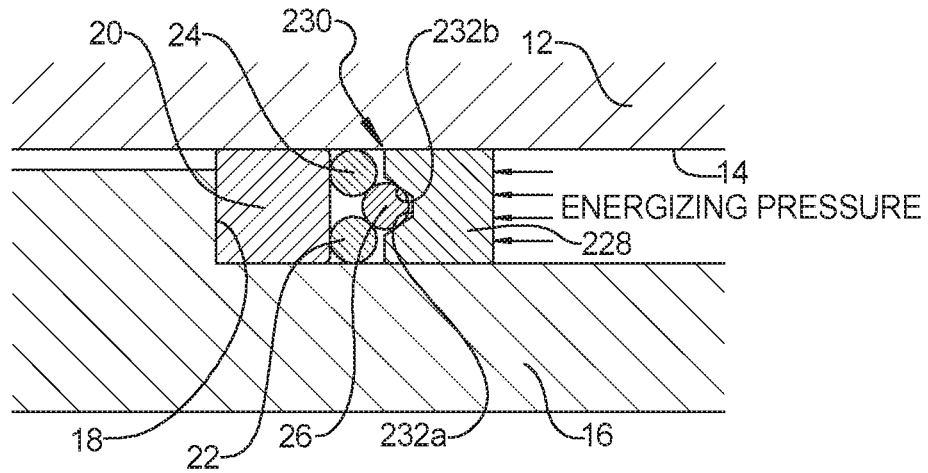
FIG. 3 is a partial cross-sectional view of a metal to metal wedge ring seal according to a third embodiment.

As a further alternative as shown in FIG. 3, the wedge member 26 can be engaged by an annular pressing member 228 having a wedge-shaped recess 230 having a pair of sloped driving surfaces 232a, 232b against which the wedge member 26 is engaged. The wedge-shaped recess 230 helps to center the wedge member 26 in proper orientation with the inner and outer ring members 22, 24.

Figure 5:
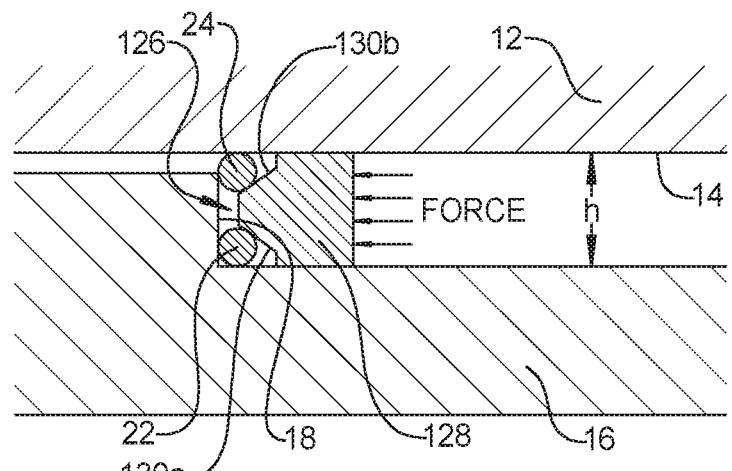
FIG. 5 is a partial cross-sectional view of a metal to metal wedge ring seal according to a fifth embodiment.
Figure 6:
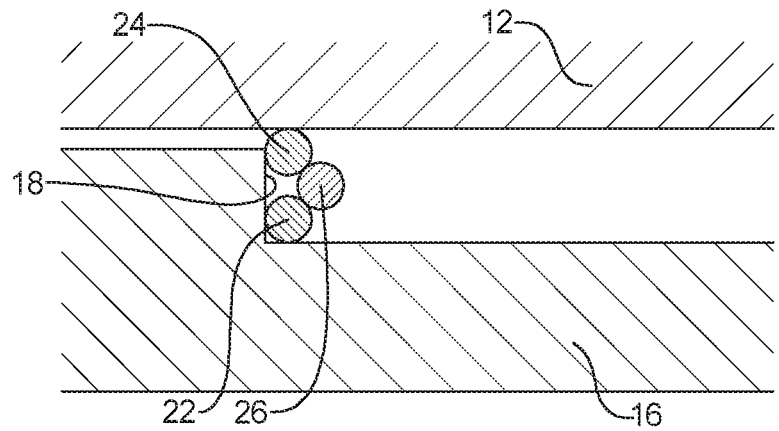
FIG. 6 is a partial cross-sectional view of a metal to metal wedge ring seal according to a sixth embodiment.

With reference to FIGS. 5 and 6, the seal designs of FIG. 2 and FIG. 1 respectively, are shown modified to remove the annular backing member 20 so that the inner ring member 22 and outer ring member 24 are disposed directly against the annular shoulder 18 of the inner member 16. In addition, the contact surfaces of the respective wedge members 126, 26 are shown engaging the inner ring member 22 and outer ring member 24 at approximately a 45° angle.

The mechanical advantages provided by the seal designs of the present disclosure create very high surface contact pressures when axial force is applied to the wedge member due to the circular cross-sectional shape of the seal rings and the small contact areas at the interface of the seal rings and the sealing surfaces, allowing an effective seal to be achieved at high pressures. The camming effect produced by the inner and outer rings and wedge member provides the ability for the wedge ring and seal ring system to radially compensate for geometry variances due to machining imperfections, radial deformation of the mandrel or housing due to pressure effects or thermal effects. In the seals of the present disclosure, a component of the energizing force applied to the wedge member is pressure so that the seal system may be self-energizing. The sealing contact pressures will increase as differential pressure is increased across the seal system.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal assembly, comprising:
   an outer member defining a bore;
   an inner member received in the bore of the outer member and one of the outer member and the inner member defining a shoulder portion;
   a first circular cross section metallic ring member having a first inner diameter and a first outer diameter, the first circular cross section metallic ring member being disposed between the inner member and the outer member and directly against the inner member;
   a second circular cross section metallic ring member having a second inner diameter and a second outer diameter that are larger than the first inner diameter and the first outer diameter, respectively, the second circular cross section metallic ring member being disposed between the outer member and the first circular cross section metallic ring member and directly against the outer member; and
   a wedge member engaging the first circular cross section metallic ring member and the second circular cross section metallic ring member for applying an axial force against each of the first and second circular cross section metallic ring members in a direction toward the shoulder portion and for applying a radially outer force against the second circular cross section metallic ring member and for applying a radially inner force against the first circular cross section metallic ring member.

2. The seal assembly according to claim 1, wherein the wedge member includes a third circular cross section metallic ring member having a third inner diameter and the third outer diameter wherein the third inner diameter is larger than the first inner diameter and smaller than the second inner diameter and the third outer diameter is larger than the first outer diameter and smaller than the second outer diameter.

3. The seal assembly according to claim 1, wherein the wedge member is made from metal.

4. The seal assembly according to claim 1, wherein the wedge member includes an annular member having an axially protruding rib engaging the first and second circular cross section metallic ring members.

5. The seal assembly according to claim 4, wherein the axially protruding rib includes angled radially inner and radially outer surfaces.

6. The seal assembly according to claim 1, further comprising an annular backing member disposed axially between the shoulder portion and the first and second circular cross section metallic ring members.

7. The seal assembly according to claim 1, wherein the inner and outer circular cross section metallic ring members are coated with a second material.

8. The seal assembly according to claim 1, further comprising an annular pressing member disposed against the wedge member.

9. The seal assembly according to claim 8, wherein the annular pressing member includes a wedge-shaped recess engaging the wedge member.

10. A seal assembly, comprising:
an outer member defining a bore;
an inner member received in the bore of the outer member and one of the outer member and the inner member defining a shoulder portion;
a first circular cross section ring member having a first inner diameter and a first outer diameter, the first circular cross section ring member being disposed between the inner member and the outer member and directly against the inner member;
a second circular cross section ring member having a second inner diameter and a second outer diameter that are larger than the first inner diameter and the first outer diameter, respectively, the second circular cross section ring member being disposed between the outer member and the first circular cross section ring member and directly against the outer member; and
a wedge member engaging the first circular cross section ring member and the second circular cross section ring member for applying an axial force against each of the first and second circular cross section ring members in a direction toward the shoulder portion and for applying a radially outer force against the second circular cross section ring member and for applying a radially inner force against the first circular cross section ring member.

11. The seal assembly according to claim 10, wherein the wedge member includes a third circular cross section ring member having a third inner diameter and the third outer diameter wherein the third inner diameter is larger than the first inner diameter and smaller than the second inner diameter and the third outer diameter is larger than the first outer diameter and smaller than the second outer diameter.

12. The seal assembly according to claim 10, wherein the wedge member includes an annular member having an axially protruding rib engaging the first and second circular cross section ring members.

13. The seal assembly according to claim 12, wherein the axially protruding rib includes angled radially inner and radially outer surfaces.

14. The seal assembly according to claim 10, further comprising an annular member disposed axially between the shoulder portion and the first and second circular cross section ring members.

15. The seal assembly according to claim 10, wherein the inner and outer circular cross section metallic ring members are coated with a second material.

16. The seal assembly according to claim 10, wherein the inner and outer circular cross section metallic ring members are made from one of a thermoplastic, composite and elastomer material.

17. The seal assembly according to claim 10, further comprising an annular pressing member disposed against the wedge member.

18. The seal assembly according to claim 17, wherein the annular pressing member includes a wedge-shaped recess engaging the wedge member.

19. A seal assembly, comprising:
an outer member defining a bore;
an inner member received in the bore of the outer member and one of the outer member and the inner member defining a shoulder portion;
a first metallic ring member having a first inner diameter and a first outer diameter, the first metallic ring member being disposed between the inner member and the outer member and directly against the inner member;
a second metallic ring member having a second inner diameter and a second outer diameter that are larger than the first inner diameter and the first outer diameter, respectively, the second metallic ring member being disposed between the outer member and the first metallic ring member and directly against the outer member; and
a wedge member engaging the first metallic ring member and the second metallic ring member for applying an axial force against each of the first and second metallic ring members in a direction toward the shoulder portion and for applying a radially outer force against the second metallic ring member and for applying a radially inner force against the first metallic ring member.

* * * * *